(12) United States Patent
Kikuchi (10) Patent No.: US 10,607,784 B2
(45) Date of Patent: Mar. 31, 2020

(54) FILM CAPACITOR, COMBINATION TYPE CAPACITOR, INVERTER, AND ELECTRIC VEHICLE

(71) Applicant: KYOCERA Corporation, Kyoto-shi, Kyoto (JP)

(72) Inventor: Naoki Kikuchi, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 253 days.

(21) Appl. No.: 15/560,093

(22) PCT Filed: Mar. 18, 2016

(86) PCT No.: PCT/JP2016/058786
§ 371 (c)(1),
(2) Date: Sep. 20, 2017

(87) PCT Pub. No.: WO2016/152800
PCT Pub. Date: Sep. 29, 2016

(65) Prior Publication Data
US 2018/0090277 A1    Mar. 29, 2018

(30) Foreign Application Priority Data

Mar. 26, 2015 (JP) ................. 2015-064650

(51) Int. Cl.
*H01G 4/33* (2006.01)
*H01G 4/38* (2006.01)
(Continued)

(52) U.S. Cl.
CPC ............... *H01G 4/33* (2013.01); *H01G 4/015* (2013.01); *H01G 4/06* (2013.01); *H01G 4/18* (2013.01);
(Continued)

(58) Field of Classification Search
CPC ........ H01G 4/306; H01G 4/008; H01G 4/015; H01G 4/30; H01G 4/33; H01G 4/06;
(Continued)

(56) References Cited

U.S. PATENT DOCUMENTS

| 4,352,145 A * | 9/1982 | Stockman | H01G 4/385 29/25.42 |
| 2008/0310075 A1* | 12/2008 | Takeoka | H01G 4/01 361/301.5 |

(Continued)

FOREIGN PATENT DOCUMENTS

| CN | 1153393 A | 7/1997 |
| JP | 52-136137 U | 10/1977 |

(Continued)

OTHER PUBLICATIONS

International Search Report, PCT/JP2016/058786, dated Jun. 7, 2016, 2 pgs.

*Primary Examiner* — Michael P McFadden
(74) *Attorney, Agent, or Firm* — Volpe and Koenig, P.C.

(57) ABSTRACT

A film capacitor includes a wound body in which a dielectric film and an electrode film are wound; and a pair of external electrodes provided respectively on a pair of end faces positioned in an axial direction of the wound body. The dielectric film includes an electrode-free portion provided on one end side in a width direction, continuously in a longitudinal direction of the dielectric film. The electrode film has a first projection portion on a surface on the other end side in the width direction, and the first projection portion has a string shape extending in the width direction.

12 Claims, 7 Drawing Sheets

(51) Int. Cl.
*H01G 4/228* (2006.01)
*H01G 4/18* (2006.01)
*H01G 4/015* (2006.01)
*H01G 4/06* (2006.01)
*H01G 4/32* (2006.01)
*H02M 7/5387* (2007.01)
*H02P 27/06* (2006.01)
*B60L 50/50* (2019.01)

(52) U.S. Cl.
CPC ............... *H01G 4/228* (2013.01); *H01G 4/32* (2013.01); *H01G 4/38* (2013.01); *H02M 7/5387* (2013.01); *H02P 27/06* (2013.01); *B60L 50/50* (2019.02); *B60L 2210/40* (2013.01); *B60L 2210/42* (2013.01); *H02P 2201/09* (2013.01); *Y02T 10/7022* (2013.01)

(58) Field of Classification Search
CPC ............ H01G 4/18; H01G 4/228; H01G 4/32; H01G 4/38; H02M 7/5387; H02P 27/06; H02P 2201/09; B60L 50/50; B60L 2210/40; B60L 2210/42; Y02T 10/7022
USPC .............................................. 361/273, 301.5
See application file for complete search history.

(56) References Cited

U.S. PATENT DOCUMENTS

| | | | | |
|---|---|---|---|---|
| 2011/0149467 | A1* | 6/2011 | Azuma | B60L 50/16 361/306.2 |
| 2015/0138691 | A1* | 5/2015 | Takeoka | H01G 4/015 361/304 |

FOREIGN PATENT DOCUMENTS

| | | |
|---|---|---|
| JP | 06-005465 A | 1/1994 |
| JP | 2006-286988 A | 10/2006 |
| JP | 2009-049139 A | 3/2009 |
| JP | 2012-105541 A | 5/2012 |

\* cited by examiner

FILM CAPACITOR, COMBINATION TYPE CAPACITOR, INVERTER, AND ELECTRIC VEHICLE

TECHNICAL FIELD

The present invention relates to a film capacitor, a combination type capacitor, an inverter, and an electric vehicle.

BACKGROUND ART

Recently, it is desired that the size of the film capacitor is reduced together with the improvement of capacitance, for the use of a DC-AC conversion device such as a power conditioner (for example, see Patent Literature 1).

CITATION LIST

Patent Literature

Patent Literature 1: Japanese Unexamined Patent Publication JP-A 6-5465 (1994)

SUMMARY OF INVENTION

A film capacitor according to the present disclosure includes a wound body in which a dielectric film and an electrode film are wound; and a pair of external electrodes provided respectively on a pair of end faces positioned in an axial direction of the wound body, the dielectric film including an electrode-free portion provided on one end side in a width direction, continuously in a longitudinal direction of the dielectric film, the electrode film having a first projection portion on a surface on the other end side in the width direction, and the first projection portion has a string shape extending in the width direction.

A combination type capacitor according to the present disclosure includes a plurality of the film capacitors mentioned above and at least one bus bar connecting all of the plurality of the film capacitors.

An inverter according to the present disclosure includes a bridge circuit including switching elements; and a capacitance member connected to the bridge circuit, the capacitance member including the film capacitor mentioned above or the combination type capacitor mentioned above.

An electric vehicle according to the present disclosure includes a power supply; the inverter mentioned above connected to the power supply; a motor connected to the inverter; and wheels driven by the motor.

DESCRIPTION OF EMBODIMENTS

Figure 1A:
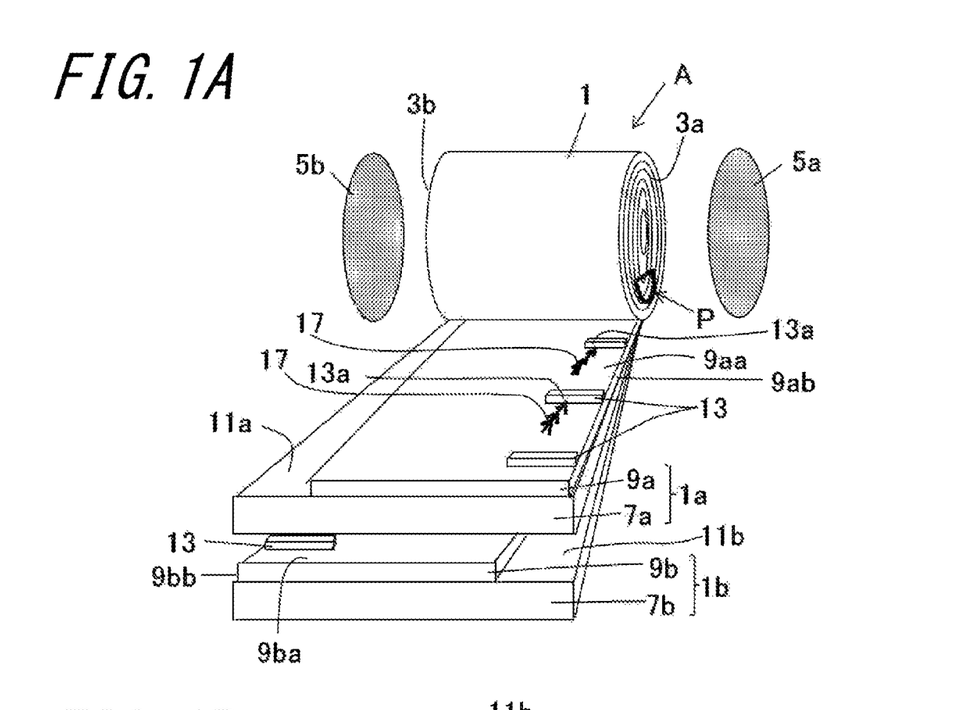
FIG. 1A is a development perspective view schematically illustrating a configuration of a film capacitor of a first embodiment.
Figure 1B:
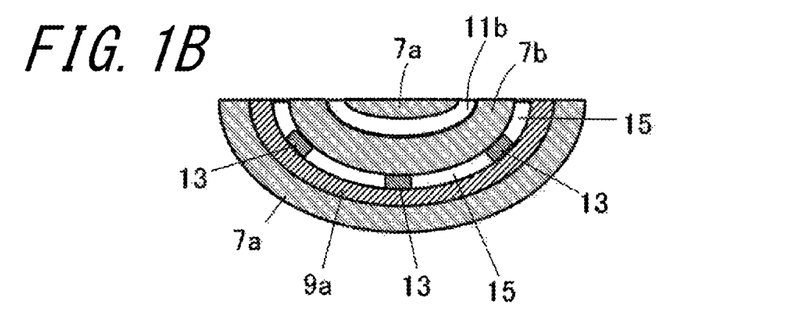
FIG. 1B is an enlarged view of a P portion in FIG. 1A.

FIG. 1A is a development perspective view schematically illustrating a configuration of a film capacitor of a first embodiment, and FIG. 1B is an enlarged view of a P portion in FIG. 1A.

In FIG. 1A, for easier understanding, extracted metalized films 1a and 1b are illustrated such that thicknesses thereof become greater as the films come closer to a front side of paper. In order to illustrate a state of an end face of a wound body 1, external electrodes are illustrated so as to be separated from the end face of the wound body 1.

A film capacitor according to the first embodiment includes the wound body 1 in which the metalized films 1a and 1b are wound, and external electrodes 5a and 5b provided on opposed end faces 3a and 3b of the wound body 1. In this case, the external electrodes 5a and 5b are preferably a metallikon electrode formed of one metallic material selected from aluminum, copper, and solder.

The metalized films 1a and 1b respectively have the electrode films 9a and 9b on main surfaces of dielectric films 7a and 7b. An electrode-free portion 11a, which is a portion which does not form the electrode film 9a, is provided on one end side of the dielectric film 7a in the width direction, continuously in the longitudinal direction, and an electrode-free portion 11b, which is a portion which does not form the electrode film 9b, is provided on one end side of the dielectric film 7b in the width direction, continuously in the longitudinal direction.

The metalized films 1a and 1b are overlaid such that the electrode-free portions 11a and 11b are disposed on different sides of the dielectric films 7a and 7b in the width direction, and the electrode films 9a and 9b are in a deviated state from each other.

In order to improve capacitance of the film capacitor per unit volume, a dielectric film and an electrode film are tried to be thinned. In the configuration, when the electrode films 9a and 9b are thinned together with the dielectric films 7a and 7b, areas of the electrode films 9a and 9b respectively exposed to the end faces 3a and 3b of the wound body 1 are reduced, and there has been a concern in that adhesiveness with the external electrodes 5a and 5b is not sufficient.

In the film capacitor A of the first embodiment, the electrode film 9a forming the metalized film 1a has a first projection portion 13 on a surface 9aa opposite to the electrode-free portion 11a, and the electrode film 9b forming the metalized film 1b has the first projection portion 13 on a surface 9ba opposite to the electrode-free portion 11b. The first projection portion 13 projects from the surfaces 9aa and 9ba in the thickness direction. These first projection portions 13 have shapes on the electrode films 9a and 9b which are so-called string shapes (hereinafter, also referred to as the string portion 13) and generally extend in the width direction of the electrode films 9a and 9b (the dielectric films 7a and 7b). The string portion 13 may be disposed such that an end thereof is exposed to the end faces 3a and 3b of the wound body 1.

Here, the fact that the string portion 13 generally extends in the width direction of the electrode films 9a and 9b includes not only a direction vertical to the longitudinal direction of the metalized films 1a and 1b (the dielectric films 7a and 7b) but also a range of ±45° of an angle to the vertical direction.

According to the film capacitor A of the first embodiment, the first projection portion 13 functions as a spacer in the end faces 3a and 3b of the wound body 1. That is, the first projection portion 13 generates a gap 15 between the electrode film 9a and the dielectric film 7b and between the electrode film 9b and the dielectric film 7a. A portion of the external electrodes 5a and 5b such as a metallikon electrode formed on the end faces 3a and 3b easily enters the gap 15. In other words, a portion of the external electrodes 5a and 5b enters a portion between the metalized films 1a and 1b.

Therefore, the electrode films 9a and 9b near the end faces 3a and 3b of the wound body 1 strongly bond to the external electrodes 5a and 5b not only on end faces thereof (hereinafter, also referred to as electrode film end faces 9ab and 9bb) but also on surfaces thereof (hereinafter, also referred to as electrode film the surfaces 9aa and 9ba). As a result, adhesiveness between the wound body 1 and the external electrodes 5a and 5b can be increased. Electrical connectivity between the electrode film 9a and the external electrode 5a and between the electrode film 9b and the external electrode 5b is improved, and a dielectric loss of the film capacitor can be decreased.

An average of thicknesses t0 of the electrode films 9a and 9b may be 50 to 300 nm. When the thicknesses t0 of the electrode films 9a and 9b are 50 to 300 nm, the electrode films 9a and 9b can be thinned. Even if the electrode films 9a and 9b are adhered to the dielectric films 7a and 7b and a tension is applied to the electrode films 9a and 9b, the electrode films 9a and 9b are hard to be broken, and an effective area contributing to the exhibition of the capacitance can be ensured. The surface roughness (Ra) of the electrode films 9a and 9b may be 5 nm or less.

Hereinafter, in the description of configurations common to the metalized films 1a and 1b, reference symbols of "a" and "b" are omitted in some cases.

Figure 2:
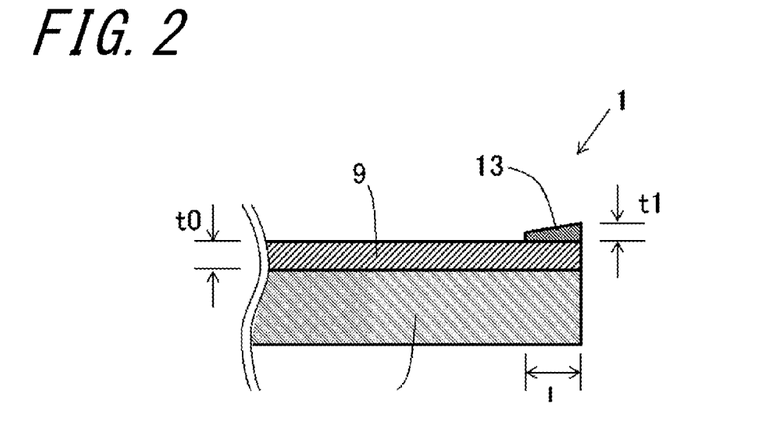
FIG. 2 is a sectional view illustrating an enlarged portion of a metalized film according to the first embodiment.

FIG. 2 is a sectional view illustrating an enlarged portion of the metalized film 1 according to the first embodiment, and illustrates a portion on a different side from an electrode-free portion 11 of the metalized film 1 in the width direction near the first projection portion (string portion) 13. As illustrated in FIG. 2, a thickness of a portion projecting from the surface of an electrode film 9, that is, an average value of thicknesses from a surface of the electrode film 9 to a tip projecting in the thickness direction of the string portion 13, is defined as a thickness t1 of the string portion 13. The thickness t1 of the string portion 13 may be 10 to 50 nm. When the thickness t1 of the string portion 13 is 10 to 50 nm, a sufficient gap 15 for a part of an additional external electrode 5 to enter can be ensured. That is, the gaps 15 of the wound body 1 between the dielectric film 7a and the electrode film 9b in the end face 3a and between the dielectric film 7b and the electrode film 9a in the end face 3b are formed, and a portion of the additional external electrodes 5a and 5b enters the gap 15. In other words, a space between the dielectric film 7a and the electrode film 9b in the end face 3a and a space between the dielectric film 7b and the electrode film 9a in the end face 3b have sufficient sizes for a part of the external electrodes 5a and 5b to enter.

In this case, the string portion 13 may have a shape in which a thickness of the wound body 1 decreases toward the inner side from the end face 3a side or toward the inner side from the end face 3b side. When the shape of the string portion 13 is a shape in which the thickness of the wound body 1 decreases toward the inner side from the end face 3a side or 3b side, the gap 15 in which a material of the external electrodes 5a and 5b enters can be provided on the end faces 3a and 3b side, and a space between the dielectric film 7a and the electrode film 9b and a space between the dielectric film 7b and the electrode film 9a can be reduced on the inner side of the wound body 1, such that adhesive regions between the electrode films 9a and 9b and the dielectric films 7a and 7b can be improved. Accordingly, the dielectric loss of the film capacitor A can be further reduced, and output capacitance can be stabilized. Therefore, a length L of the string portion 13 is desirably 50 to 500 µm.

The string portion 13 may be present in a region in which at least a distance of the wound body 1 from the end faces 3a and 3b is 500 µm or less. The metallikon electrode forming the external electrodes 5a and 5b can enter a portion of a distance of about 500 µm from the end faces 3a and 3b of the wound body 1, and adhesiveness between the wound body and the external electrodes 5a and 5b can be increased by forming the gap 15 in this region.

As a material of the electrode film 9 and the string portion 13 to be applied to the film capacitor A, aluminum is desirable, but zinc or an alloy thereof may be used instead of aluminum. The electrode film 9 and the string portion 13 are desirably the same material since the resistance difference therebetween can be reduced.

In the film capacitor A, a plurality of first projection portions (string portions) 13 may be arranged at predetermined intervals in the longitudinal direction of the wound metalized films 1a and 1b. For example, in the surfaces 9aa and 9ba of the electrode films 9a and 9b, even if the dielectric films 7a and 7b are adhered to the electrode films 9a and 9b so as to cover the string portion 13, the plurality of first projection portions (string portions) 13 are arranged at predetermined intervals in the longitudinal direction of the wound metalized films 1a and 1b, such that the probability of securing the gap 15 around the string portion 13 can be increased. In this case, intervals of the arrangement of the plurality of first projection portions (string portions) 13 in the longitudinal direction of the metalized films 1a and 1b may be in the range of 0.5 to 5 mm.

Another projection portion having a different shape may be present in adjacent to the string portion 13 formed on the surface of the electrode film 9. When another projection portion is present, the gap 15 can be further secured around the string portion 13. Examples of the projection portion include a second projection portion 17 in a shape having a stem portion and branched branch portions. The second projection portion 17 may be in contact with a side portion 13a of the string portion 13. The second projection portion 17 may be disposed such that the stem portion extends in a substantially vertical direction to the string portion 13 on the surface of the electrode film 9 with the side portion 13a of the string portion 13 as a starting point. An average of the thicknesses of the second projection portions 17 is 10 to 50 nm in the same manner as in the string portion 13. The thickness of the second projection portion 17 may decrease toward the tip of the second projection portion 17 from the starting point of the second projection portion 17 which is in contact with the side portion 13a of the string portion 13. The thickness of the second projection portion 17 decreases toward the tip from the starting point which is in contact with the side portion 13a of the string portion 13, and adhesiveness between the dielectric films 7a and 7b and the electrode films 9a and 9b increases. The second projection portion 17 may be, for example, dendrite crystal. The first projection portion 13 and the second projection portion 17 may be connected to each other. The first projection portion may be crystalline.

The projection portion may be present in a portion other than the surfaces 9aa and 9ba positioned on the opposite side of the electrode-free portions 11a and 11b side. For example, the projection portion may be present on the surface near the electrode-free portion 11 of the electrode film 9 and near the center portion in the width direction. These projection portions may have thinner thicknesses than those of the first projection portion 13 and the second projection portion 17 positioned on the surfaces 9aa and 9ba.

Figure 3A:
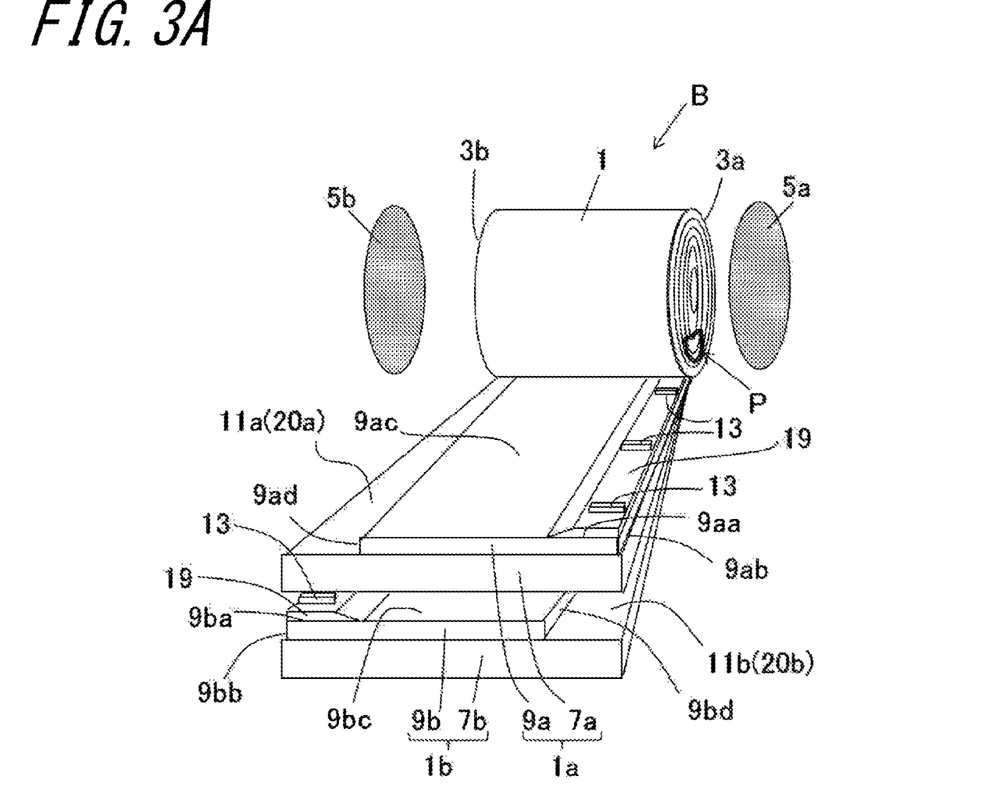
FIG. 3A is a development perspective view schematically illustrating a film capacitor of a second embodiment.
Figure 3B:
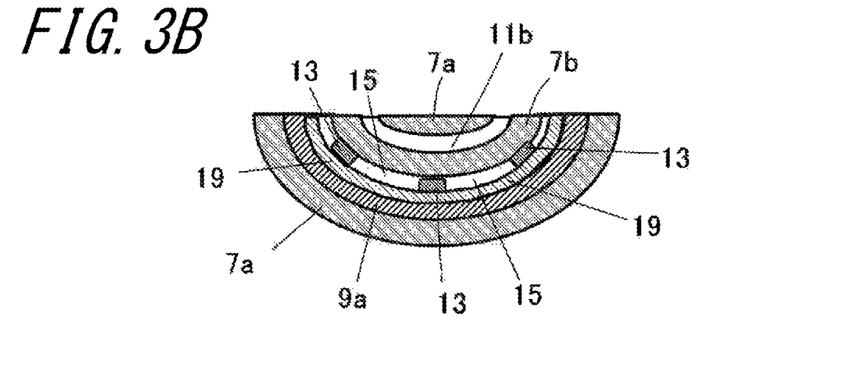
FIG. 3B is an enlarged view of a P portion in FIG. 3A.

FIG. 3A is a development perspective view schematically illustrating a film capacitor of a second embodiment, and FIG. 3B is an enlarged view of a P portion in FIG. 3A. With respect to FIG. 3A, for easier understanding, the extracted metalized films 1a and 1b are illustrated such that thicknesses thereof become greater as the films come closer to a front side of paper. In order to illustrate the state of the end face of the wound body 1, the external electrodes are illustrated to be separated from the end faces of the wound body 1. A difference between a film capacitor B of the second embodiment illustrated in FIGS. 3A and 3B and the film capacitor A of the first embodiment illustrated in FIGS. 1A and 1B is shapes of electrode films 9a and 9b.

The film capacitor B of the second embodiment has a portion in which thicknesses of the center portions 9ac and 9bc of the electrode films 9a and 9b become greater (hereinafter, also referred to as the heavy edge portion 19), on the surfaces 9aa and 9ba opposite to the electrode-free portions 11a and 11b side of the electrode films 9a and 9b, continuously in the longitudinal direction. The heavy edge portion 19 may have a thickness of two to four times those of the center portions 9ac and 9bc.

Figure 4:
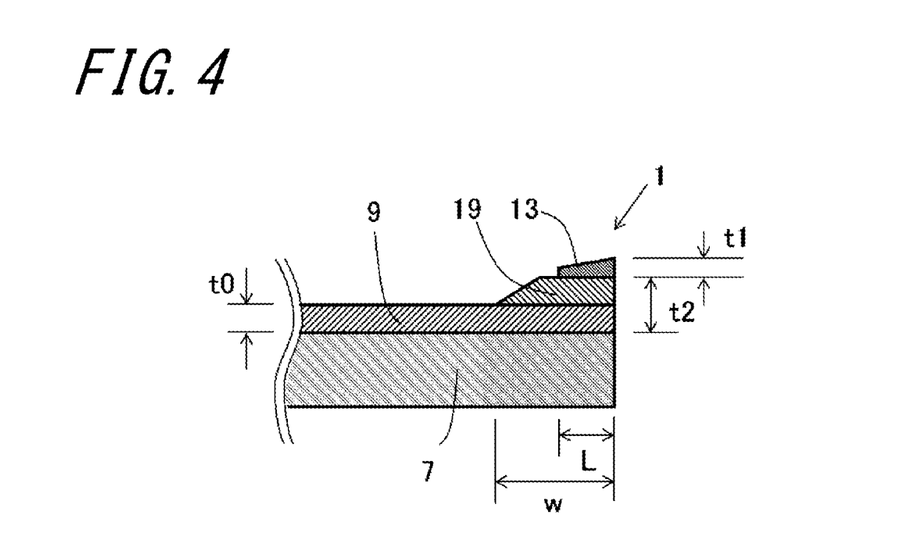
FIG. 4 is a sectional view illustrating an enlarged portion of a metalized film according to the second embodiment.

FIG. 4 is a sectional view in which a portion of the metalized film 1 according to the present embodiment is enlarged, and illustrates a portion near the first projection portions (string portions) 13 on a side different from the electrode-free portion 11 in the width direction of the metalized film 1. As illustrated in FIG. 4, a thickness of an electrode film in the heavy edge portion 19 is set as t2 (hereinafter, also simply referred to as the thickness t2 of the heavy edge portion 19 in some cases). A difference Δt between the thickness t2 of the heavy edge portion 19 and the thicknesses of the center portions 9ac and 9bc may be 50 to 300 nm, and is particularly similar to the thicknesses t0 of the electrode films 9a and 9b (9ac and 9bc). The thicknesses of the center portions 9ac and 9bc of the electrode films 9a and 9b are the same as the thicknesses t0 of the electrode films 9a and 9b, and Δt=t2−t0 may be satisfied.

When Δt and the thicknesses t0 of the electrode films 9a and 9b are the same, a step generated between a region in which both of the electrode films 9a and 9b are overlapped and a region in which the electrode-free portions 11a and 11b are present (region in which only one of the electrode films 9a and 9b are present) in the axial direction of the winding can be removed. A width w of the heavy edge portion 19 may be the same as each of widths of the electrode-free portions 11a and 11b.

When the heavy edge portion 19 is provided on the surface of the electrode films 9a and 9b, as disposed above, when the wound body 1 is formed by winding the metalized films 1a and 1b, spatial regions 20a and 20b formed by the electrode-free portions 11a and 11b on the dielectric films 7a and 7b (gaps between the dielectric films 7a and 7b in 11a and 11b) can be narrowed down by this heavy edge portion 19. Accordingly, when an end face of the electrode film 9a on the electrode-free portion 11a side is denoted as 9ad and an end face of the electrode film 9b on the electrode-free portion 11b side is denoted as 9bd, insulation properties between the end face 9ad and the external electrode 5b and the insulation properties between the end face 9bd and the external electrode 5a can be secured. Since the insulation properties can be secured in this manner, the widths of the electrode-free portions 11a and 11b can be narrowed down, such that the areas (effective areas) of the electrode films 9a and 9b contributing to capacitance can be increased.

The film capacitor B has the first projection portions (string portions) 13 respectively on the heavy edge portion 19 of the surface 9aa on the end face 3a side connected to the external electrode 5a of the electrode film 9a and on the heavy edge portion 19 of the surface 9ba on the end face 3b side connected to the external electrode 5b of the electrode film 9b. Also in this case, the film capacitor B having high electrical connectivity to the external electrodes 5a and 5b and a low dielectric loss can be obtained. The length L of the string portion 13 exposed to the end faces 3a and 3b of the wound body 1 may be shorter than the width w of the heavy edge portion 19.

Figure 5:
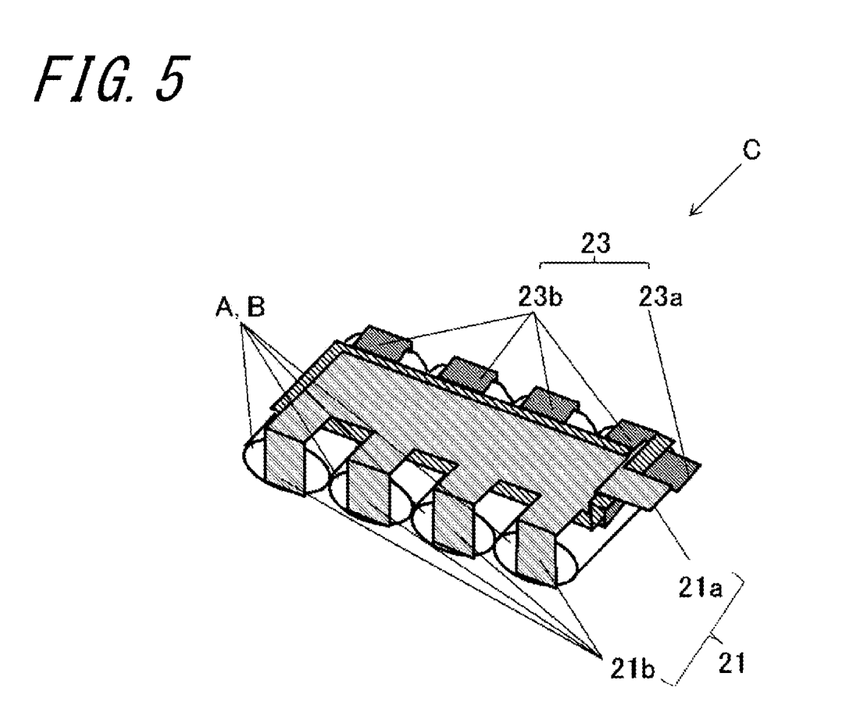
FIG. 5 is a perspective view schematically illustrating a configuration of one embodiment of a combination type capacitor.

FIG. 5 is a perspective view schematically illustrating the configuration of one embodiment of a combination type capacitor. In FIG. 5, in order to easily understand the configuration, a case and a molding resin are omitted in the illustration. A combination type capacitor C of the present embodiment has such a configuration that a plurality of film capacitors A or B are connected in parallel to each other by a pair of bus bars 21 and 23. The bus bars 21 and 23 include terminal portions 21a and 23a for external connection and extraction terminal portions 21b and 23b respectively connected to the external electrodes 5a and 5b of the film capacitors A and B.

When the film capacitor A or B is applied to the combination type capacitor C, the combination type capacitor C having a small dielectric loss can be obtained.

The combination type capacitor C can be obtained by attaching the bus bars 21 and 23 via a bonding material to the external electrodes 5a and 5b respectively formed on the both ends of the wound body 1, in a state in which the plurality (four in the present embodiment) of film capacitors A or B are arranged.

The film capacitors A and B and the combination type capacitor C may be a resin mold type (case mold type) capacitors obtained by storing the capacitors in the case and filling cavity in the case with a resin.

The combination type capacitor C illustrated in FIG. 5 is disposed in the major diameter direction of the cross sections of the film capacitors A or B, but the same effect can be obtained even in a structure in which the film capacitors A and B are stacked in a minor diameter direction of the cross sections.

Figure 6:
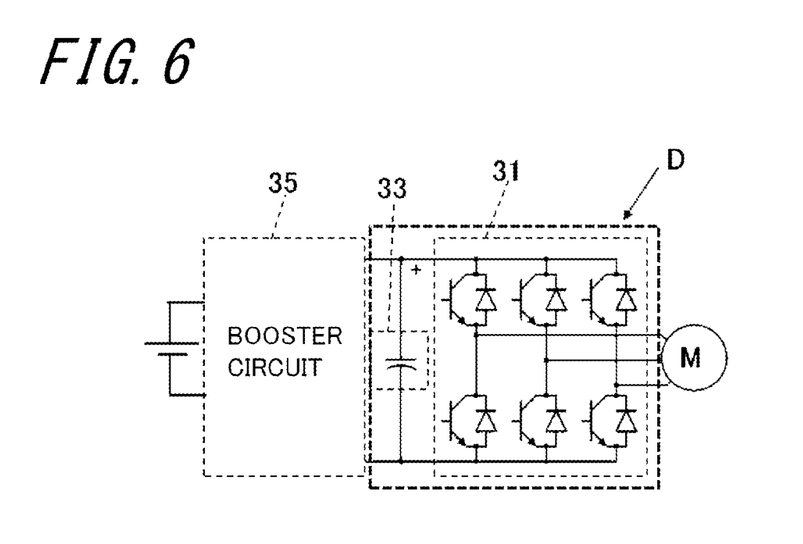
FIG. 6 is a schematic block diagram illustrating a configuration of one embodiment of an inverter.

FIG. 6 is a schematic block diagram illustrating a configuration of one embodiment of an inverter. An example of an inverter D which produces alternating current from direct current is illustrated in FIG. 6. As illustrated in FIG. 6, the inverter D according to the present embodiment includes a bridge circuit 31 including switching elements (for example, Insulated Gate Bipolar Transistor (IGBT)) and diodes and a capacitance member 33 disposed across input terminals of the bridge circuit 31 for voltage stabilization. Here, the film capacitor A or B or the combination type capacitor C is applied as the capacitance member 33.

The inverter D is connected to a booster circuit 35 for boosting the voltage of a direct current power supply.

Meanwhile, the bridge circuit 31 is connected to a motor generator (a motor M) serving as a driving source.

Figure 7:
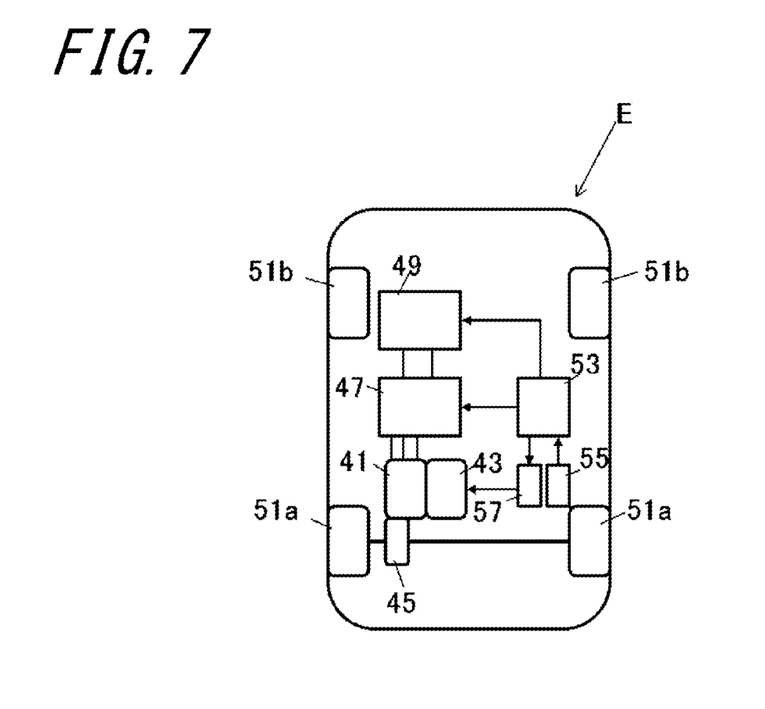
FIG. 7 is a schematic block diagram illustrating one embodiment of an electric vehicle.

FIG. 7 is a schematic block diagram illustrating one embodiment of the electric vehicle. In FIG. 7, an example of a hybrid electric vehicle (HEV) is provided as an electric vehicle E.

In FIG. 7, a reference numeral 41 denotes a driving motor, a reference numeral 43 denotes an engine, a reference numeral 45 denotes a transmission, a reference numeral 47 denotes an inverter, a reference numeral 49 denotes a power supply (battery), and reference numerals 51a and 51b denote front wheels and rear wheels.

The electric vehicle E has a main function in which the output of the motor 41, the engine 43, or the both, as driving sources, is transmitted to a pair of the right and left front wheels 51a via the transmission 45, and the power supply 49 is connected to the motor 41 via the inverter 47.

The electric vehicle E illustrated in FIG. 7 is provided with the vehicle ECU 53 for performing comprehensive control of the entire electric vehicle E. The vehicle ECU 53 receives driving signals inputted from the electric vehicle E in response to operation of an ignition key 55, an accelerator pedal, a brake, and the like which are not illustrated by a driver or the like. On the basis of the driving signals, the vehicle ECU 53 outputs instruction signals to an engine ECU 57, the power supply 49, and the inverter 47 as a load. In response to the instruction signal, the engine ECU 57 controls the revolution speed of the engine 43 and drives the electric vehicle E.

When the inverter D to which the film capacitor A or B or the combination type capacitor C of the present embodiment is applied as the capacitance member 33 is mounted on, for example, the electric vehicle E as illustrated in FIG. 7, the current control of a control device such as an ECU mounted on an electric vehicle can be thermally stabilized because the film capacitor A or B or the combination type capacitor C has a small dielectric loss.

In addition to the above-mentioned hybrid electric vehicle (HEV), the inverter D of the present embodiment may be applied to various power conversion application products such as an electric vehicle (EV), a fuel-cell vehicle, an electric bicycle, an electric generator, and a solar battery.

Subsequently, with reference to the film capacitor A of the first embodiment and the film capacitor B of the second embodiment, a manufacturing method thereof is described. First, an organic resin to be the base material of the dielectric film 1 is prepared and a sheet-like formed body to be the dielectric films 7a and 7b is manufactured by a molding method such as a doctor blade method. As the organic resin, for example, a polyarylate-based resin may be used.

Subsequently, a metal film to be the electrode films 9a and 9b is formed by depositing a metal component such as Al (aluminum) on the surface of the obtained sheet-like formed body. As the condition for forming the metal film, the degree of vacuum and the deposition rate are set in a predetermined condition. The degree of vacuum may be $1 \times 10^{-4}$ to $1 \times 10^{-3}$ Pa, and the deposition rate may be 0.05 to 0.4 nm/sec and particularly 0.05 to 0.3 nm/sec. When the thickness of the metal film is set to 100 nm or greater, 130 nm or greater, and particularly 150 nm or greater, the crystal which becomes the first projection portions (string portions) 13 extending in the width direction is easily formed.

In the depositing step of forming a metal film, a sheet-like formed body wound in a roll is unwound, an unwound sheet-like formed body is moved above a deposition source, and a metal component is deposited thereon. The sheet-like formed body on which the metal component is deposited is further moved from the deposition source, and is rewound as another roll. At this point, by adjusting a running speed of the sheet-like formed body above the deposition source, forms of the first projection portion 13 and the second projection portion 17 can be adjusted.

Examples of the method of heating the metal component in the time of deposition include a high frequency heating method, a resistance heating method, and an electron beam method.

A pattern of a planar shape of the first projection portion may be manufactured by forming a mask on the formed metal films 9a and 9b, and the first projection portion 13 may be formed by performing second deposition.

In a case where a metal film having the heavy edge portion 19 is formed on the surfaces 9aa and 9ba of the electrode films 9a and 9b, the deposition rate may be 0.05 to 0.2 nm/sec.

The heavy edge portion 19 may be manufactured by performing deposition two or more times. In this case, a metal film is formed so as to form deposition-free portions which become the electrode-free portions 11a and 11b on both ends of the sheet-like formed body in the width direction, in the first deposition. In the second deposition, deposition is performed by interposing a mask between the sheet-like formed body and a vapor deposition source so that a metal film is further formed only around the center portion of the sheet-like formed body in the width direction. The portion of the metal film formed by the second vapor deposition becomes the heavy edge portion 19 having a thicker thickness than that of the metal film formed by the first deposition. Subsequently, the formed sheet-like formed body of the metal film is divided into two in the width direction by a slitter, so as to form the metalized films 1a and 1b.

The metalized films 1a and 1b are overlaid and wound as illustrated in FIG. 1A, 1B, 3A or 3B, so as to form the wound body 1 of the film capacitors A and B.

In the film capacitor A or B of the present embodiment, at least the plurality of first projection portions 13 are present respectively on the surfaces 9aa and 9ba of the electrode films 9a and 9b which are in contact with the surfaces of the dielectric films 7a and 7b. Accordingly, the slipperiness between the dielectric films 7a and 7b and the electrode films 9a and 9b can be increased. As a result, even if the number of windings of the metalized films 1a and 1b is great, the stress generated due to the contact between the dielectric film 7a and the electrode film 9b and the contact between the dielectric film 7b and the electrode film 9a can be reduced. In the film capacitor A or B, the breakdown voltage in a case where a voltage is applied can be increased. When a voltage is applied to the film capacitor A or B, the generation of defects such as cracks caused by expansion of the dielectric films 7a and 7b can be reduced.

Subsequently, metallikon electrodes are formed on the end faces 3a and 3b of the wound body 1, as the external electrodes 5a and 5b. In this case, the first projection portions 13 are formed on the surface 9aa of the electrode film 9a on the end face 3a side of the wound body 1 and on the surface 9ba of the electrode film 9b on the end face 3b side, and the gaps 15 are present on the end face 3a and the end face 3b. In the forming of the external electrodes 5a and 5b, for example, metal spraying, a sputtering method, and a plating method are suitable.

Subsequently, the film capacitor A or B according to the present embodiment can be obtained by covering the surface of the wound body 1 which forms the external electrodes 5a and 5b with an exterior member.

The combination type capacitor C can be obtained by bonding the bus bars 21 and 23 via a bonding material to the external electrodes 5a and 5b respectively formed on the end faces 3a and 3b of the wound body 1 in a state in which the plurality (four in the present embodiment) of film capacitors A or B are arranged.

In a case where the combination type capacitor C is formed in a type of being molded with a resin, the combination type capacitor C is manufactured by putting the film capacitors A or B to which the bus bars 21 and 23 are attached and connected into a case and filling the case with a resin.

Examples

Hereinafter, a film capacitor was manufactured and evaluated. First, a polyarylate-based resin was prepared as an organic resin for forming a dielectric film. After a resin solution was prepared by dissolving the polyarylate-based resin in toluene, a sheet-like formed body to be a dielectric film was manufactured using an applicator. The average thickness of the sheet-like formed body was 5 μm.

A metal film to be an electrode film was formed by depositing aluminum (Al) on a surface of the obtained sheet-like formed body. The deposition of aluminum was performed under the conditions presented in Table 1.

An electrode film having a heavy edge portion was manufactured by performing the deposition two times. In the first deposition, a metal film was formed by forming electrode-free portions on both end faces of the sheet-like formed body in the width direction. In the second deposition, a mask was inserted between the sheet-like formed body and deposition source, a metal film was further formed only around the center portion of the dielectric film in the width direction. Subsequently, the sheet-like formed body in which the metal film was formed was divided into two in the width direction by a slitter, so as to manufacture a metalized film.

Subsequently, the manufactured metalized film was wound so as to manufacture a wound body in a shape illustrated in FIGS. 1A, 1B and 2. Subsequently, metallikon electrodes having copper as a main component were formed on the end faces of the obtained wound body.

The following evaluation was performed on the manufactured film capacitor.

The surface of the electrode film formed on the manufactured metalized film was observed with a digital microscope so as to determine whether the first projection portion (string portion) and the second projection portion (dendrite crystal) is present or not. The observed region was determined by cutting arbitrary three portions of the manufactured metalized film to obtain samples and observing the samples. At this time, the size (area) of the sample was about 25 mm$^2$.

The width and length of the string portion were measured by observing the surface of the electrode film with a digital microscope at a 100-fold magnification. The thickness of the string portion (thickness from the surface to the tip projecting from the electrode film) was measured by processing the cross section of the electrode film including the string portion by ion etching and observing the cross section with a scanning electron microscope (SEM) at a 100000-fold magnification and an average value thereof was calculated. In the manufactured samples (Sample Nos. 2 and 3), the string portion had the thickness t1 of 15 nm, a width of 1 μm, and an average length of 500 μm.

Whether the second projection portion (dendrite crystal) formed on the electrode film was present was confirmed by observing the surface of the electrode film with a digital microscope at a 100-fold magnification. In Sample No. 3, dendrite crystals were observed.

The dielectric loss (tan δ) of the film capacitor was measured by using a digital multimeter under the conditions of a temperature of 25° C., an applied voltage of 1 V, and a frequency of 1 kHz. In the charge and discharge test, a winding type film capacitor with 10 μF was manufactured, and a charge and discharge cycle in which charging with DC 600 V was performed and then a forced short circuit was performed was repeated ten times. A dielectric loss (tan δ) after the charge and discharge cycle was repeated ten times was measured and was compared with that before charge and discharge.

As a comparative example, a film capacitor was manufactured by using the electrode film not having a first projection portion and was evaluated in the same manner (Sample No. 1).

TABLE 1

| Sample No. | Structure of electrode film | Thickness of electrode film t0 nm | Degree of vacuum Pa | Deposition rate nm/sec | String portions (first projection portions) Existence state Existence/Non-existence | Thickness t1 nm | Width μm | Heavy edge portion Existence/Non-existence | Dendrite crystal (second projection portion) Existence/Non-existence | tan δ before charge and discharge % | tan δ after charge and discharge % |
|---|---|---|---|---|---|---|---|---|---|---|---|
| 1 | — | 190 | 6.7 × 10$^{-3}$ | 0.4 | Non-existence | — | — | Non-existence | Non-existence | 0.04 | 0.8 |
| 2 | FIGS. 1A and 1B | 220 | 6.7 × 10$^{-4}$ | 0.3 | Existence | 15 | 1 | Non-existence | Non-existence | 0.02 | 0.1 |
| 3 | FIG. 2 | 270 | 6.7 × 10$^{-4}$ | 0.2 | Existence | 15 | 1 | Existence | Existence | 0.02 | 0.04 |

As clearly understood from Table 1, compared with a film capacitor (Sample No. 1) of which an electrode film did not have a first projection portion (string portion), film capacitors (Sample Nos. 2 and 3) of which the electrode films had first projection portions (string portions) had low dielectric losses.

Particularly, a film capacitor (Sample No. 3) of which the electrode film had a heavy edge portion had a low dielectric loss of 0.04% even after the charge and discharge test.

REFERENCE SIGNS LIST

A, B: Film capacitor
C: Combination type capacitor
D: Inverter
E: Electric vehicle
1: Wound body
1, 1a, 1b: Metalized film 3, 3a, 3b: End face
5, 5a, 5b: External electrode
7, 7a, 7b: Dielectric film
9, 9a, 9b: Electrode film
11, 11a, 11b: Electrode-free portion
13: First projection portion (String portion)
15: Gap
17: Second projection portion (Dendrite crystal)
19: Heavy edge portion
20a, 20b: Spatial region
21, 23: Bus bar
31: Bridge circuit
33: Capacitance member
35: Booster circuit
41: Motor
43: Engine
45: Transmission
47: Inverter
49: Power supply
51a: Front wheel
51b: Rear wheel
53: Vehicle ECU
55: Ignition key
57: Engine ECU

The invention claimed is:

1. A film capacitor, comprising:
a wound body in which a dielectric film and an electrode film are wound; and
a pair of external electrodes provided respectively on a pair of end faces positioned in an axial direction of the wound body,
the dielectric film including an electrode-free portion provided on one end side in a width direction, continuously in a longitudinal direction of the dielectric film,
the electrode film having a first projection portion on a surface on the other end side in the width direction, and the first projection portion having a string shape extending in the width direction,
the electrode film further comprising a second projection portion on the surface on the other end side, the second projection portion having a branched shape.

2. The film capacitor according to claim 1, wherein a plurality of the first projection portions are arranged at predetermined intervals in the longitudinal direction.

3. The film capacitor according to claim 1, wherein the second projection portion is in contact with the first projection portion.

4. The film capacitor according to claim 3, wherein a starting point of extension of the second projection portion is a contact region with the first projection portion.

5. The film capacitor according to claim 1, wherein the second projection portion is crystalline.

6. The film capacitor according to claim 1, wherein the first projection portion is crystalline.

7. The film capacitor according to claim 1, wherein a thickness of an end portion on the other end side in the width direction of the electrode film is greater than a thickness of a center portion in the width direction of the electrode film.

8. A combination type capacitor, comprising:
a plurality of the film capacitors according to claim 1; and
at least one bus bar connecting all of the plurality of the film capacitors.

9. An inverter, comprising:
a bridge circuit including switching elements; and
a capacitance member connected to the bridge circuit,
the capacitance member including the film capacitor according to claim 1.

10. An inverter, comprising:
a bridge circuit including switching elements; and
a capacitance member connected to the bridge circuit,
the capacitance member including the combination type capacitor according to claim 8.

11. An electric vehicle, comprising:
a power supply;
an inverter connected to the power supply;
a motor connected to the inverter; and
wheels driven by the motor,
the inverter being the inverter according to claim 9.

12. An electric vehicle, comprising:
a power supply;
an inverter connected to the power supply;
a motor connected to the inverter; and
wheels driven by the motor,
the inverter being the inverter according to claim 10.

* * * * *